LOGIC SWITCH WITH ACTIVE FEEDBACK NETWORK

Filed Jan. 13, 1967 4 Sheets-Sheet 1

INVENTORS
TEH-SEN JEN
LEONARD WEISS

BY Martin G. Reiff
ATTORNEY

April 28, 1970 TEH-SEN JEN ET AL 3,509,363

LOGIC SWITCH WITH ACTIVE FEEDBACK NETWORK

Filed Jan. 13, 1967 4 Sheets-Sheet 3

LOGIC SWITCH WITH ACTIVE FEEDBACK NETWORK
Filed Jan. 13, 1967 4 Sheets-Sheet 4
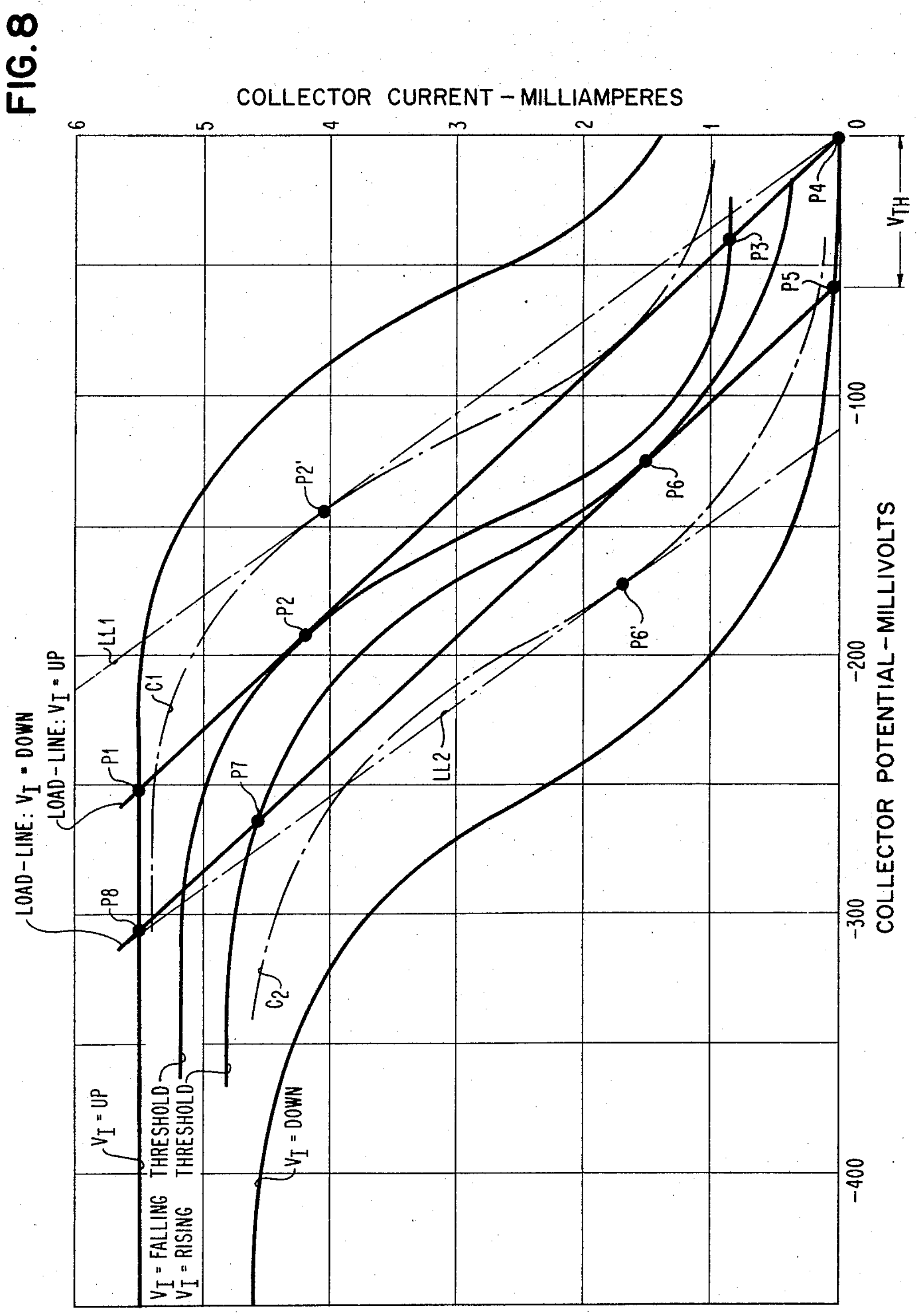

United States Patent Office

3,509,363

Patented Apr. 28, 1970

3,509,363
LOGIC SWITCH WITH ACTIVE FEEDBACK NETWORK

Teh-Sen Jen, Pittsburgh, Pa., and Leonard Weiss, Poughkeepsie, N.Y., assignors to International Business Machines Corporation, Armonk, N.Y., a corporation of New York Filed Jan. 13, 1967, Ser. No. 609,074
Int. Cl. H03k *19/08*
U.S. Cl. 307—203 13 Claims

ABSTRACT OF THE DISCLOSURE

A transistor logic circuit of the current switch type is disclosed with an active negative feedback network to maintain the quiescent potential of the reference base of the common-base stage within a predetermined incremental range about the quiescent potential of the input base of the first stage. The active feedback network is disclosed as a second transistor current switch having its own inner feedback network comprising a first conductor extending from the collector of the common-base stage to the collector of the first stage of the second current switch and a second conductor extending from said collector of the first stage to the reference base of said common-base stage.

BACKGROUND OF THE INVENTION

Field of the invention

This invention relates to switching circuits for performing logic functions in digital computers and for other applications where binary switches are required.

Description of the prior art

The overall performance capability of digital computers and other systems employing switching circuits is largely dependent upon the switching speed of the individual circuits, particularly in view of the enormous number of switching operations which must be performed in any given time period or for any particular computation or data process. Therefore, the art has devoted itself to the development of circuits having the highest possible switching speed.

The so-called "current switch" disclosed in United States Patent No. 2,964,652 to H. S. Yourke, issued Dec. 13, 1960 and assigned to the assignee of the present application, has come to be well known as significantly superior to other switching circuits with respect to both speed and stability. (1,2) Experimental comparison has shown the current switch to be about ten times as fast as its fastest rivals, the diode-logic and modified resistor-transistor-logic circuits. (3) The current switch is probably used more extensively than any other digital circuit.

Because of its importance and extensive use, since its initial publication (4) the current switch has been the subject of intensive studies by many workers in attempts to improve its speed and other characteristics. The usual approach has been based upon sound reasoning. Since the current switch changes from one state to the other when the input potential traverses the fixed reference potential, it was believed by those skilled in the art that the time for this traversal to occur could be reduced by employing positive feedback to vary a non-fixed reference potential in a direction opposite to that of the input potential swing during the switching operation, that is, toward the input potential until the traverse and away from the input potential thereafter. Because the two potentials would "meet" sooner as a result of the positive feedback, the circuit would switch faster, or so it was reasoned. Furthermore it was expected that the resulting increased overdrive would further accelerate the switching speed.

(1), (2), (3), (4)—See "Publications Referred to in Specification" at end of specification.

All such known attempts failed, with the possible sole exception of a novel load-line displacing technique disclosed in prior copending application Ser. No. 495,826, entitled "Feedback Current Switch With Load-Line Displacing Network," filed Oct. 14, 1965 by T. S. Jen and assigned to the assignee of the present application. The prior positive feedback arrangements resulted in a substantial loss in switching speed rather than the improvement to be expected. Nevertheless the reasoning behind the positive feedback concept was seemingly irrefutable and many of those skilled in the art still adhered to and pursued this approach at the time of the present invention.

Others skilled in the art, in view of the many futile efforts to devise circuit modifications which would improve the speed of the current switch, became resigned to the belief that the conventional version of the current switch is the ultimate form of this circuit in the sense that no substantial increase in speed is obtainable by modifying its circuitry and that only with the advent of new faster transistors or other active components would any significant speed improvement be possible.

The present invention has achieved a substantial increase in speed by an approach directly contrary to both the prevailing positive feedback and ultimate circuit philosophies.

It has been discovered that by applying *negative* feedback to urge the reference potential in the *same* direction as the input potential swing the switching speed of a current switch is so substantially improved that for the first time it is possible to obtain a propagation delay of less than one nanosecond.

Although analysis would indicate that negative feedback should cause the input potential and reference potential to traverse or meet each other at a later time so as to retard the switching action, this adverse effect is obviated in the present invention by delaying the feedback until after the switching action is well under way. The feedback then becomes effective in the quiescent condition between switching to maintain the reference potential within a small predetermined incremental range about the input potential so that the circuit is effectively on the threshold of switching. Hence when the input potential changes in response to the next input signal, it quickly traverses the closely adjacent reference potential to provide a faster switching speed. The reference potential remains at its original quiescent level for a predetermined time after traversal by the input potential so as to provide a large overdrive which further improves the switching speed.

This negative feedback arrangement is disclosed in prior copending application Ser. No. 495,943, now U.S. Patent No. 3,458,719 entitled "Threshold Logic Switch With a Feedback Current Path" filed Oct. 14, 1965 by L. Weiss and assigned to the assignee of the present application. Both active and passive feedback networks are disclosed in said application Ser. No. 495,943.

It has been discovered that a current switch having a load-line displacing network as disclosed in said application Ser. No. 495,826 is particularly suited for use as the active feedback network in the feedback current switch arrangement of said application Ser. No. 495,943, and the present application is directed to this combination.

That is, a first current switch is controlled in the manner disclosed in Ser. No. 495,943 by an active negative feedback including a second current switch constructed in the manner disclosed in Ser. No. 495,826.

SUMMARY OF THE INVENTION

It is therefore a primary object of the present invention to provide in a first current switch actuated by traversal of input and reference potentials a novel network including a second current switch for maintaing the quiescent value of the reference potential within a small predetermined incremental range about the input potential so that the two potentials will traverse each other quickly and thereby provide a substantially faster switching action.

A further object is to maintain the reference potential within said predetermined range by varying the reference potential in time-delayed phase with respect to the input potential, the amount of the phase delay being optimally determined by the hysteresis of the second current switch.

Another object is to provide a novel current switch which requires only one power supply, as opposed to prior current switch circuits which generally require at least two power supplies.

A further object, again achieved by virtue of the negative feedback, is to provide a switching circuit having greater stability with respect to quiescent direct current levels. Any tendency of a direct current level to vary due to an input level variation or to a component parameter deviation is counteracted by the negative feedback.

Another object is to provide a novel feedback switching circuit wherein the switching speed is less adversely affected by heavy loads on the outputs. This is achieved by deriving the feedback signal from a collector of the second current switch instead of from the output terminal at the connection to the load, thereby isolating the loading effects from the feedback network.

Still another object is to eliminate the reference base lead inductance that is inherent in the conventional current switch when embodied in the form of a monolithic integrated circuit. This elimination of base lead inductance further improves the high frequency stability.

Another object is to provide a current switch having a higher input impedance and lower input capacitance so as to result in less loading of the preceding circuit. This is achieved in the preferred embodiment of the present invention because the reference base is no longer grounded but is in effect connected to the relatively high impedance of the feedback network which impedance is reflected through the transistors to the input base so as to increase the impedance looking into the latter.

A further object is to provide a novel switch circuit wherein the rise time of the output is less dependent on the rise time of the input signal. If the rise time of the input signal is sufficiently slow it is even possible to provide a negative propagation delay. That is, the output sigal will reach its midpoint before the input signal reaches its midpoint.

Although the subject invention is disclosed for purposes of illustration as embodied in a transistor current switch, it is readily embodied in any other form of switching circuit which is switched in response to the traversal of input and reference potentials, and irrespective of whether such other form of circuit utilizes transistors or any other type of active component.

BRIEF DESCRIPTION OF THE DRAWINGS

FIG. 8 shows the voltage-current characteristics and load-lines at the collector of the first transistor of the active feedback network.

DESCRIPTION OF THE PREFERRED EMBODIMENTS

Figure 3:
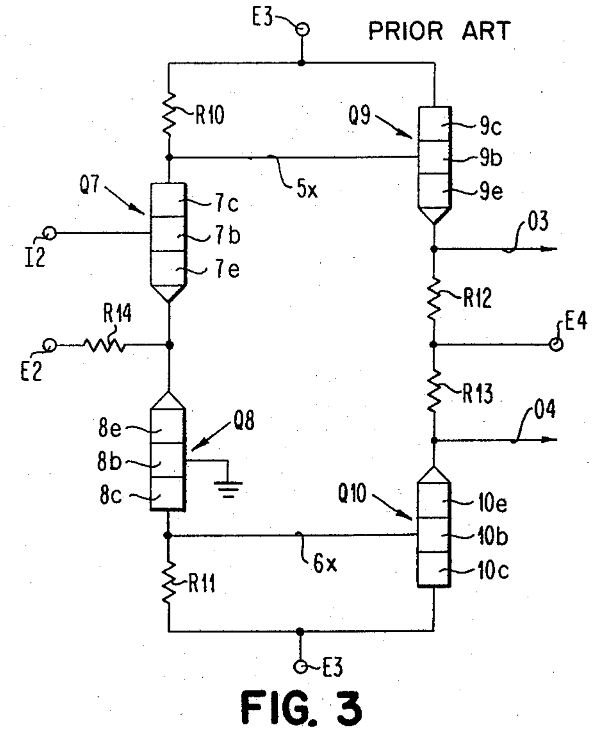
FIG. 3 shows a conventional emitter-follower current switch in accordance with the prior art.

Referring now to the drawings in more detail, a better understanding of the subject invention may be had by first studying the mode of operation of a conventional emitter-follower type of current switch as disclosed in FIG. 3. In this figure transistors Q7, Q8 constitute the current switch stage and transistors Q9, Q10 constitute the emitter-follower stage. The latter provides a relatively high load impedance for the current switch stage Q7, Q8 so as to prevent the latter from being excessively loaded by succeeding circuits (not shown).

Input terminal I2 is connected to the base **7*b* of transistor Q7 having its collector 7*c* connected through collector load resistor R10 to a positive power supply E3. The emitter 7*e* of transistor Q7 and the emitter 8*e* of transistor Q8 are connected at a common node to a constant current source comprising a resistor R14 and a negative power supply E2. Resistor R14 is of sufficiently high impedance so as to pass a relatively constant current which is switched through either transistor Q7 or Q8 in a manner to be described. The base 8*b* of transistor Q8 is connected to a fixed reference potential which for purposes of illustration is shown in FIG. 3 as at ground level. The collector 8*c* of transistor Q8 is connected through collector load resistor R11 to the power supply E3**.

The collector **7*c* of transistor Q7 is direct-coupled by lead 5*x* to the base 9*b* of transistor Q9, and the collector 8*c* of transistor Q8 is similarly direct-coupled by lead 6*x* to the base 10*b* of transistor Q10. The respective collectors 9*c*, 10*c* of transistors Q9, Q10 are directly connected to power supply E3. The emitters 9*e*, 10*e* of transistors Q9, Q10 are connected through respective resistors R12, R13 to a negative power supply E4. The two outputs O3, O4 of the circuit are taken from the emitters 9*e*, 10*e***.

Figure 5:
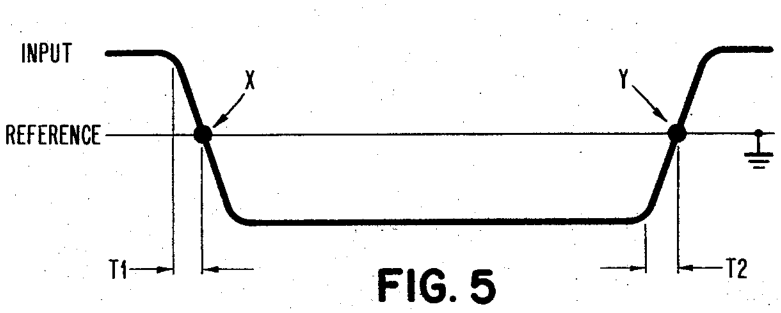
FIG. 5 is an idealized plot of the input and reference potentials during the switching operation of the prior art current switch circuit of FIG. 3.

Referring now to FIG. 5, the mode of operation of the prior art circuit of FIG. 3 will be described. The potential of the signal at the input I2 is designated by the label "INPUT" in FIG. 5, and the potential at the reference base **8*b* is shown at a constant ground level designated "REFERENCE." Assuming that the potential at the input I2 is initially at the "up" level, it will be seen that the base-to-emitter potential of transistor Q7 is greater than that of transistor Q8. Hence the current flows through transistor Q7 while transistor Q8 is either cut off or has substantially less current flow therethrough. The potential at the collector 7*c* of transistor Q7 is therefore at a "down" level whereas the potential at the collector 8*c* of transistor Q8 is at a relatively "up" level. This difference of collector potential when applied to the respective bases 9*b*, 10*b* of transistors Q9, Q10, biases transistor Q9 to the "off" state and transistor Q10 to the "on" state. Hence initially the emitter 9*e* and output lead O3 are at a "down" level whereas the other emitter 10*e* and output lead O4** are at the "up" level.

Now let it be assumed that the input potential at input I2 swings downwardly as shown in FIG. 5. As long as the input potential at base **7*b* remains above the reference potential at base 8*b*** the conditions of the quiescent state described above remain substantially unchanged. However, after the input potential traverses the reference potential at the point marked X the base-to-emitter voltage of transistor Q8 becomes greater than that of transistor Q7 since the emitters *7e*, *8e* of both transistors are tied together and are at the same potential. Assuming that these transistors have matching characteristics, the current formerly flowing through transistor Q7 then switches to flow through transistor Q8 instead.

It will thus be seen in FIG. 5 that there is a substantial time delay T1 from the instant when the input signal commences to swing downwardly until the instant when the input potential traverses the reference potential at the point X. The circuit cannot undergo its switching action until after this time delay.

After the switching operation the initial polarities are reversed. Since transistor Q7 is now "off," its collector 7*c* as well as the emitter 9*e* of transistor Q9 and output lead O3 are at the "up" level, whereas transistor Q8 is "on" so that its collector 8*c* as well as the emitter 10*e* of transistor Q10 and output lead O4 are at a "down" level. This state will be maintained until the input potential at input terminal I2 moves upwardly to again traverse the reference potential as indicated at the point Y in FIG. 5 at which time the fixed current switches from transistor Q8 back to transistor Q7. It will thus be seen that the turn-on switching operation of transistor Q7 does not occur until after the time delay T2 from the instant when the input potential starts to rise to the instant when the input potential again traverses the reference potential at point Y.

Figure 6:
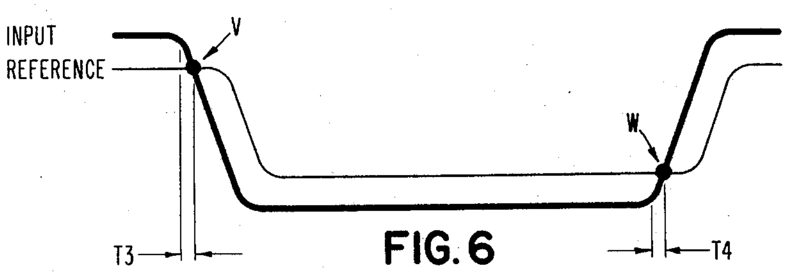
FIG. 6 is an idealized plot of the input and reference potentials during the switching operation of the present invention.

The basic approach by which the subject invention achieves a faster switching speed is shown schematically in FIG. 6. The plot of the input signal potential in the latter figure is substantially identical to that in FIG. 5. However, it will be noted in FIG. 6 that the reference potential is now no longer fixed at ground level but instead varies in time-delayed phase with the input potential so as to remain within a predetermined incremental range about the latter.

More specifically, when the input potential is at its "up" level the reference potential is also at its "up" level which is below but closely adjacent to that of the input potential. When the latter swings downwardly, the reference potential is maintained at its "up" level for a time-delay period until after the input potential has traversed the reference potential at the point V. On the other hand, when the input potential is at its "down" level, the reference potential will also be at its "down" level but at a somewhat higher level than that of the input potential. When the latter swings upwardly, the reference potential is maintained at its "down" level for a time-delay period until after the input potential has again traversed the reference potential at the point W. It will be seen in FIG. 6 that the resulting time delays T3 and T4 are substantially less than the corresponding delays T1 and T2 in FIG. 5.

Figure 1:
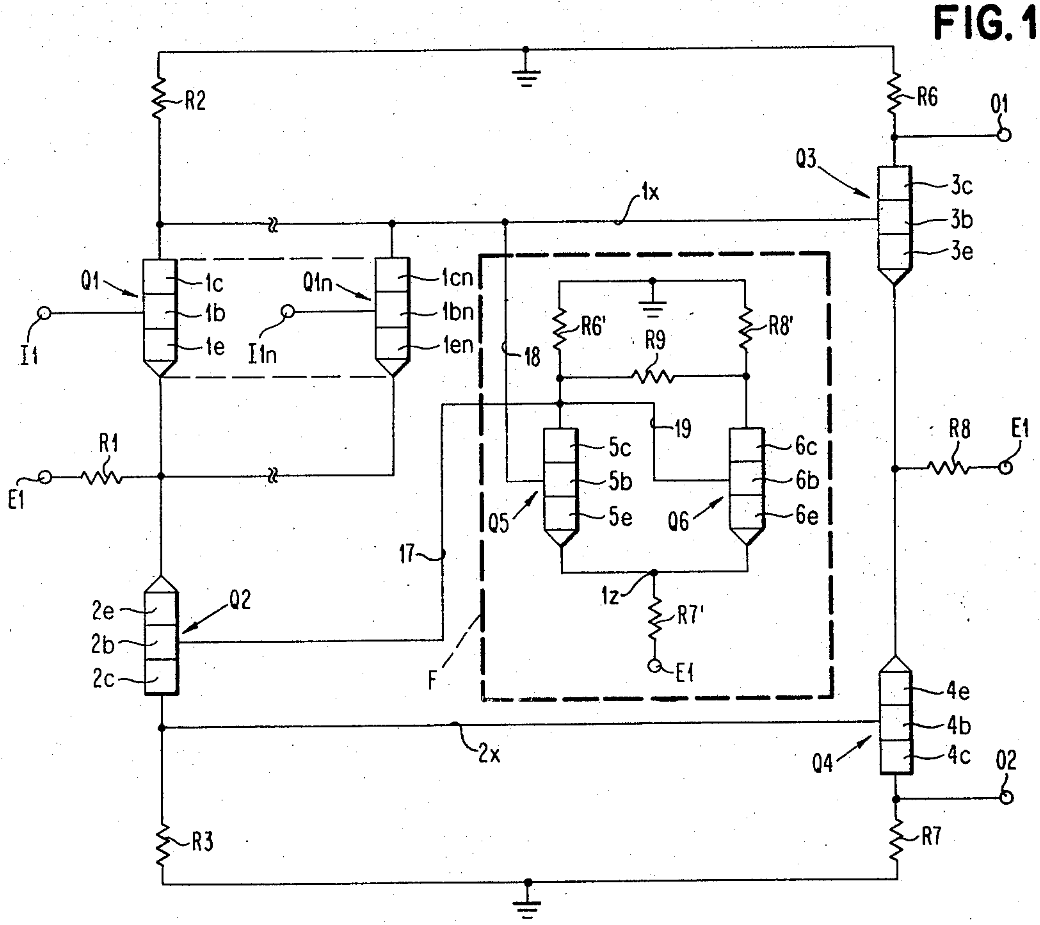
FIG. 1 is a circuit diagram showing a first embodiment of the invention wherein the current switch is in cascade with an output stage functioning as a differential amplifier.

Proper operation of the circuit of FIG. 1 requires that there be a time delay of reference potential swing with respect to that of the input potential swing as shown in FIG. 6. That is, the reference potential should be maintained at its quiescent level until after the input potential has traversed the reference potential to commence the switching action. Furthermore, it is preferable that the reference potential remain at the quiescent level for a time period after the instant of traverse in order to provide a large overdrive which further improves the switching speed.

Figure 2:
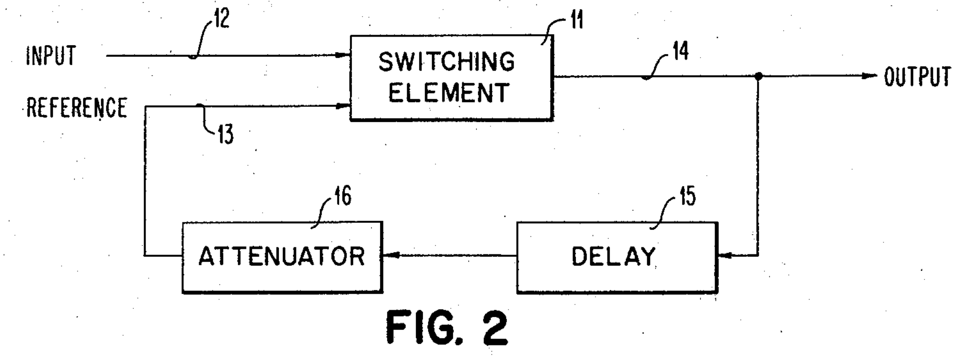
FIG. 2 is a schematic diagram of a switching circuit illustrating the basic principle of the invention.

Referring to FIG. 2, there is shown schematically a switching circuit illustrating the basic inventive concept utilizing negative feedback to derive the reference potential. A switching element 11 is actuated to switch from one of its binary states to the other in response to traversal of the respective potentials at the signal input 12 and the reference input 13. Extending from output 14 is a feedback network comprising a delay 15 and an attenuator 16 in series between output 14 and reference input 13. Several preferred embodiments realizing these functional blocks are described below.

Referring to FIG. 1 in detail, the first stage comprising transistors Q1 to Q1*n* inclusive and Q2 constitutes a current switch. In order to provide the OR and NOR logic functions a plurality of transistors are connected in parallel with transistor Q1 as shown by only the single transistor Q1*n* for simplicity in illustration. Collectors 1*c*, 1*cn*, 2*c* of transistors Q1, Q1*n*, Q2 are connected through respective collector load resistors R2 and R3 to ground.

The emitters 1*e*, 1*en*, 2*e* of transistors Q1, Q1*n*, Q2 are connected at a common node to a constant current source comprising a resistor R1 and a negative power supply E1. The input terminals I1, I1*n* are connected to the respective bases 1*b*, 1*bn* of transistors Q1, Q1*n* whereas the base 2*b* of transistor Q2 has applied thereto a time-delayed in-phase reference potential derived in a manner to be described below.

The final stage comprising transistors Q3, Q4 functions as a differential amplifier. Power supply E1 and resistor R8 constitute a source of constant current which is switched to either transistor Q3 or transistor Q4 in response to the polarity of the difference between the signal at base 3*b* and that at base 4*b*.

The collectors 3*c*, 4*c* of transistors Q3, Q4 are connected to ground through respective collector load resistors R6, R7. The respective emitters 3*e*, 4*e* of transistors Q3, Q4 are connected at a common node to resistor R8. The base 3*b* of transistor Q3 is direct-coupled by lead 1*x* to the collector 1*c* of transistor Q1, and the base 4*b* of transistor Q4 is similarly direct-coupled by lead 2*x* to the collector 2*c* of transistor Q2.

This differential amplifier stage Q3, Q4 provides a high impedance load on the first stage to permit higher fan-out power of the circuit while maintaining unity gain. The stage Q3, Q4 has the further advantage of providing greater noise tolerance in that noise of a magnitude less than that required to reach the switching threshold will not be transmitted to the outputs O1, O2.

The varying time-delayed in-phase reference potential for application to the base 2*b* of transistor Q2 is derived in the following manner.

The circuitry within the dashed-line box designated F is an active negative feedback network comprising a second current switch in the form disclosed in said application Ser. No. 495,826. Current switch F includes a pair of transistors Q5 and Q6 and an inner feedback network controlling the operation of same.

Transistor Q5 is provided with an input lead 18 extending from lead 1*x* and connected to its base 5*b*. The collector 5*c* of transistor Q5 is connected to one end of a load resistor R6′ having its other end grounded as shown. The emitter 5*e* of transistor Q5 is connected to a node 1*z* which is in turn connected to a constant current source comprising a power supply terminal E1 and a resistor R7′.

Transistor Q6 has its collector 6*c* connected to one end of load resistor R8′ having its other end grounded as shown. The emitter 6*e* of transistor Q6 is connected to the constant current source at the node 1*z*. The base 6*b* of transistor Q6 is direct-coupled by lead 19 to the collector 5*c* of transistor Q5. The effect of this connection of the base 6*b* is to apply to the latter a reference potential which swings in opposite phase to that of the input potential at base 5*b* so as to constitute a direct-current positive feedback network. The circuit F as thus for described in detail constitutes the well-known feedback current switch of the prior art. It is disclosed in said application Ser. No. 495,826 that a substantial improvement in switching speed may be obtained by adding the single resistor R9 coupling the collector 5*c* of transistor Q5 (and hence also the base 6*b* of transistor Q6)

to the collector $6c$ of transistor Q6. However in the present circuit a different resistance value is selected for resistor R9 so as to slow down the switching speed of circuit F and thereby increase the speed of the main switch Q1, Q2 in a manner to be explained below. A lead 17 extends from the collector $5c$ of transistor Q5 to the base $2b$ of transistor Q2 to close the outer feedback loop and feed to the base $2b$ an in-phase time-delayed signal constituting the varying reference potential.

There are two different respective load-lines at collector $5c$ for the states when the input potential at base $5b$ is "up" and when it is "down." When the input potential is "up," transistor Q6 is "off" and the load-line is the Thevenin equivalent of resistor R6′ in parallel with the series combination of resistors R8′ and R9. However when the input potential is "down," transistor Q6 conducts so that the load-line has the same magnitude as the case when the input potential is "up" but is now biased to a Thevenin equivalent voltage:

$$V_{TH}=\frac{I_c \cdot R \cdot 6' \cdot R9}{R6'+R8'+R9}$$

where $I_c$ is the collector current of transistor Q6.

The bias condition causes the load-line for the "down" output potential to be displaced to the left as shown in FIG. 8. As a result the switching thresholds are such the the curve designated "$V_I$=FALLING THRESHOLD" is above the curve designated "$V_I$=RISING THRESHOLD."

Assuming that the input potential at base $5b$ is at its upper quiescent level, the operating point of transistor Q5 will be at the intersection P1 of both the load-line and characteristic curve which are designated "$V_I$=UP." As the input potential falls the operating point will move from P1 to the switching threshold at P2 where the load-line is tangent to the knee of the curve designated "$V_I$=FALLING THRESHOLD." Any further lowering of the input potential will cause the operating point to move almost instantly from P2 to P3.

As the input potential at base $5b$ falls still lower the operating point would eventually reach the point P4 if it were not for the fact that when the input potential is down, the load-line is displaced to the left to the new biased position designated "$V_I$=DOWN." Hence the quiescent point when the input potential is at its lowermost level will be at the intersection of this load-line with the characteristic curve designated "$V_I$=DOWN," this intersection being designated P5. It will be understood that this explanation has been simplefied in that as the input potential falls the load-line simultaneously shifts from the initial position to the biased position. Hence the operating point will not actually move in a rectilinear path along the respective load-line but will instead move in a somewhat curvilinear path in the direction in which the load-line is being displaced.

In a similar manner, as the input potential rises the operating point will travel up the biased load-line designated "$V_I$=DOWN" from the quiescent point P5 until it reaches the switching threshold at the point P6 where said load-line is tangent to the knee of the curve designated "$V_I$=RISING THRESHOLD." The operating point will then switch almost instantly to the point designated P7. When the input potential is finally at its uppermost level the operating point would be at P8 if it were not for the fact that the load-line has simultaneously shifted to its original unbiased position designated "$V_I$=UP." Hence when the input potential is at its uppermost level, the operating point will again be at the quiescent point designated P1.

The switching speed of second current switch F may be predetermined by selecting the resistance values of resistors R6′, R8′ and R9 so as to vary the slope of the load-lines and the magnitude of the Thevenin offset or bias voltage of the "down" load-line. The load-lines and threshold characteristic curves shown in solid lines in FIG. 8 are selected so as to provide a relatively slow switching speed for second current switch F, so as to improve the switching speed of the circuit as a whole, as will be explained below.

The effect of the load-line slope and Thevenin bias voltage on the speed of current switch F may be seen by comparing the slow parameters shown in solid lines with the dash-dot lines representing load-lines and threshold characteristic curves which might be selected when it is desired to have second current switch F operate as fast as possible as in said prior copending application Ser. No. 495,826. In the latter event it will be seen that the switching threshold in the falling direction occurs at the operating point P2′ at the tangent point of dash-dot load-line LL1 with the threshold characteristic curve C1. Since the latter represents an input potential which is higher than that represented by the solid-line characteristic curve designated "$V_I$=FALLING THRESHOLD" for the slow speed operation preferred in the present application, it will be seen that the falling threshold is reached sooner for the parameters represented by the dash-dot lines.

Similarly, the rising threshold for the fast switching parameter situation occurs at the operating point P6′ at the tangent point of the dash-dot load-line LL2 and the dash-dot characteristic curve C2. Since the latter represents an input potential which is lower than that represented by the solid-line characteristic curve designated "$V_I$=RISING THRESHOLD," it will be seen that the switching threshold in the rising direction is attained sooner with the parameters represented by the dash-dot lines than with those represented by the solid lines.

This ability to control the switching speed of second current switch F provides one of the major advantages of this active feedback network over the passive feedback networks disclosed in said prior copending application Ser. No. 495,943. More specifically, the greater the delay between the input and reference potentials as displayed in FIG. 6 the faster will be the total switching time for the circuit as a whole. This is due to the increased overdrive which results from the increased delay. In the preferred embodiments of said prior application Ser. No. 495,943 the delay is a function of the circuit components in the forward transmission path and is not a parameter that may be significantly varied in the design of the circuit. With the substitution for the passive feedback network of an active feedback network in the form of the second current switch F the delay of the fed-back reference signal with respect to the input signal may be varied by controlling the switching speed of current switch F, and hence in the instant application the delay is an independent function not related to the circuit output switching time. In order to increase the delay between the input and reference potentials and thereby increase the "overdrive" and hence the switching speed of the first current switch Q1, Q1$n$, Q2 and the circuit as a whole, second current switch F is made to operate as slow as possible by selecting resistance values for resistors R6′, R8 and R9 to provide load-lines and threshold characteristic curves such as those shown by solid lines in FIG. 8.

However, there is a limit as to how slow the second switch F may be made to operate without destroying the operativeness of the circuit as a whole. As the value of resistor R9 increases the Thevenin bias voltage $V_{TH}$ is reduced so that both the rising and falling load-lines approach each other until they merge into a single coincident load-line when the value of R9 becomes infinite. In this event the upper potential level of collector $5c$ is at ground level and therefore the upper potential level of base $2b$ of transistor Q2 is also at ground level in view of the direct coupling provided by lead 17. This presents an indeterminant situation because the upper potential level of the base $1b$ of transistor Q1 is also at ground level, whereas it should be at a higher level than the reference potentials for proper operation, as shown in FIG.

6. Therefore resistor R9 serves the dual function of maintaining the reference potential at the base 2*b* displaced from the input potential at the base 1*b* and also of permitting the active feedback current switch network F to be designed with switching thresholds to maximize the delay for second current switch F and thereby maximize the switching speed of first current switch Q1, Q1*n*, Q2 and the circuit as a whole.

This limitation on the value of resistor R9 may be removed by tying the upper ends of collector load resistors R6′, R8′ to a power supply terminal having a potential somewhat below ground level. However this significantly increases the cost of the power supply.

Another important advantage of the active feedback network of the present invention over the passive feedback networks disclosed in said prior copending application Ser. No. 495,943 resides in the isolation of the reference base 2*b* of transistor Q2 from the output terminals O1, O2 so as to prevent the injection of noise signals, transmission line reflections and other spurious signals which may appear at output terminals O1, O2.

Still another advantage of the active feedback network of the present application resides in the improved control that may be obtained over the feedback signal injected into the base 2*b* of transistor Q2. The potential at the collector 5*c* of transistor Q5 is relatively constant and fixed at either its upper or lower level depending upon the state of current switch F, and these levels are almost entirely independent of deviations in voltage of the input signal at the base 5*b*. Hence the feedback signal to the base 2*b* of transistor Q2 which is a dependent variable in said prior application Ser. No. 495,943 becomes now a well-controlled independent variable in the present application.

Figure 4:
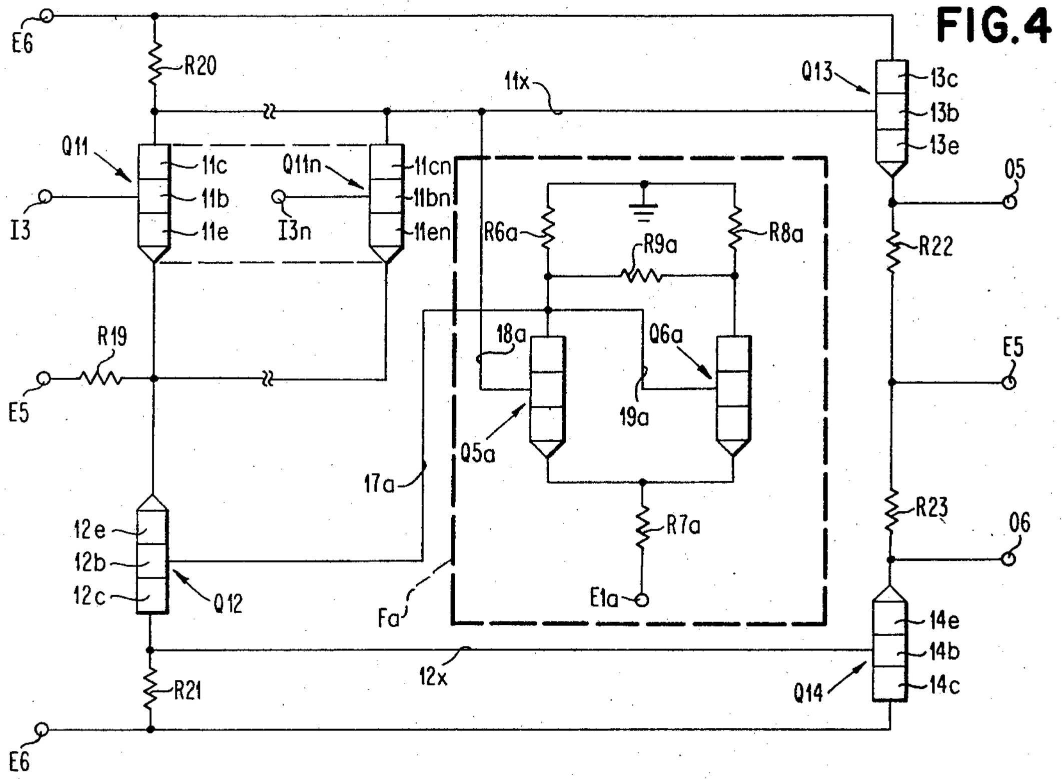
FIG. 4 shows another embodiment of the invention wherein the output stage operates in the emitter-follower mode.

Referring now to FIG. 4 there is disclosed a modified form of the invention as applied to an emitter-follower type of current switch. In this figure transistors Q11, Q12 constitute the primary current switch and transistors Q13, Q14 constitute the emitter-follower stage which provides a relatively high load impedance for current switch Q11, Q12 so as to prevent the latter from being excessively loaded by succeeding circuits (not shown).

Input terminals 13 to 13*n* are connected to the respective bases 11*b* to 11*bn* of transistors Q11 to Q11*n* having their collectors 11c to 11*cm* connected through collector load resistor R20 to a positive power supply E6. The emitters 11*e* to 11*en* of transistors Q11 to Q11*n* and the emitter 12*e* of transistor Q12 are connected at a common node to a constant current source comprising a resistor R19 and a negative power supply E5. Resistor R19 is of sufficiently high impedance so as to pass a relatively constant current which is switched to either one or more transistors Q11 to Q11*n* or to transistor Q12. The collector 12*c* of transistor Q12 is connected through collector load resistor R21 to the power supply E6.

The collectors 11*c* to 11*cn* of transistors Q11 to Q11*n* are direct-coupled by lead 11*x* to the base 13*b* of transistor Q13, and the collector 12*c* of transistor Q12 is similarly direct-coupled by lead 12*x* to the base 14*b* of transistor Q14. The respective collectors 13*c*, 14*c* of transistors Q13, 314 are directly connected to power supply E6. The emitters 13*e*, 14*e* of transistors Q13, Q14 are connected through respective resistors R22, R23 to a negative power supply E5. The two outputs O5, O6 of the circuit are taken from the emitters 13*e*, 14*e*.

The varying reference potential for current switch Q11, Q12 is fed to base 12*b* of transistor Q12 by an active feedback network F*a*. The latter may be identical to the active network F of FIG. 1 and corresponding elements of network F*a* have applied thereto the same reference numerals with the suffix *a* but without a prime symbol.

Figure 7:
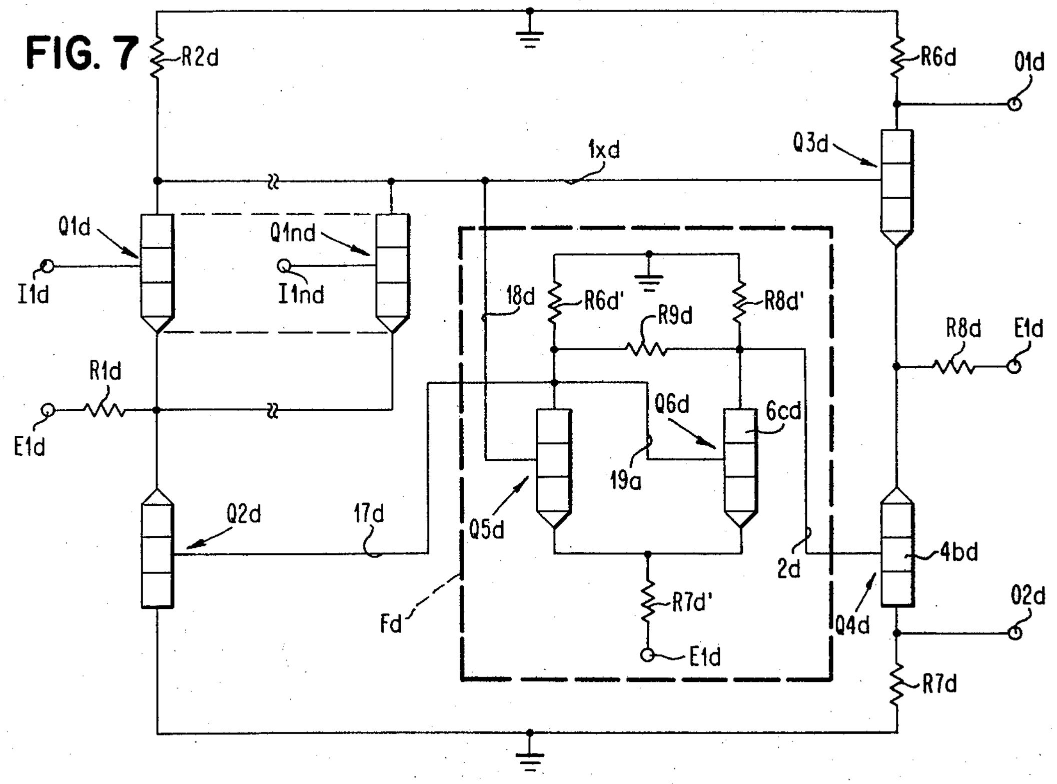
FIG. 7 is a third embodiment similar to that of FIG. 1 but having the lower transistor of the output differential amplifier stage driven by the second current switch which also constitutes the active feedback network for the first current switch.

FIG. 7 shows a modification similar to the embodiment of FIG. 1 and having the same reference numerals with the suffix *d* applied to corresponding elements. However, it will be noted that in FIG. 7 the base 4*bd* of transistor Q4*d* is direct-coupled by lead 2*d* to the collector 6*cd* of transistor Q6*d* so as to be driven by the latter instead of by the collector 2*c* of transistor Q2 as in FIG. 1.

PUBLICATIONS REFERRED TO IN SPECIFICATION (1) Rigby, G. A., "High-Speed Emitter-current Switching" Proceedings of the I.R.E.E. Australia, January 1964, 15.

(2) Rapp, A. K., Robinson, J. L., "Rapid-Transfer Principles for Transistor Switching Circuits," IRE Trans. on Circuit Theory, vol. CT–8, pp. 454–461, December 1961.

(3) Bapat, Y. N., "High Speed Computer Switching Circuits," J. Inst. Telecom. Engrs. (India), vol. 8, No. 1, 1962, pp. 50–60.

(4) Yourke, H. S., "Millimicrosecond Transistor Current Switching Circuits," IRE Trans. on Circuit Theory, vol. CT–4, pp. 236–240, September 1957.

The specific embodiments shown in the drawings and described above are merely illustrative of several of the many forms which the invention may take in practice and numerous modifications thereof will readily occur to those skilled in the art without departing from the scope of the invention as delineated in the appended claims which are to be construed as broadly as permitted by the prior art.

We claim:

1. A switching circuit comprising
an input node,
an active element switchable in response to the potential of the input node traversing a reference potential, and
an active direct-current negative feedback network to maintain the quiescent value of the reference potential within a predetermined incremental range about the quiescent potential of the input node,
said active feedback network comprising a current switch.

2. A switching circuit as recited in claim 1 wherein said current switch comprises
a pair of transistors each having a base, a collector and an emitter,
an input node connected to the base of a first of said transistors,
a constant current source connected to the emitters of both transistors,
a potential supply,
a pair of load impedances each connected between a collector of a respective one of the transistors and said potential supply,
conductive means connecting the collector of said first transistor to the base of the second transistor, and
impedance means mutually connecting the collectors.

3. A logic circuit comprising
an input node,
an active element switchable in response to the potential of the input node traversing a reference potential,
an active feedback network to maintain the quiescent value of the reference potential within a predetermined range about the quiescent potential of the input node, and
means to delay the effect of said network until after said input node potential traverses said reference potential,
said active feedback network comprising a current switch having an inner feedback network.

4. A logic circuit as recited in claim 3 wherein said current switch comprises
a pair of transistors each having a base, a collector and an emitter,
an input node connected to the base of a first of said transistors,
a current source connected to the emitters of both transistors,
a potential supply, a pair of load resistors each connected between a respective one of the collectors and said potential supply, a direct-coupling between the collector of said first transistor and the base of the second transistor, and a resistor having opposite ends respectively connected to said collectors.

5. A switching circuit comprising an input node for receiving an input signal having a predetermined amplitude, a switch actuable in response to the potential of the input node traversing a reference potential, and an active feedback network to vary the reference potential with an amplitude less than that of the input signal and approximately in phase therewith but with a time delay with respect thereto, said active feedback network comprising a current switch having an inner positive feedback network.

6. A switching circuit as recited in claim 5 wherein said current switch comprises a source of constant current, a switching device having two current paths and switchable either to a first state to pass said current through one of said paths in response to one of said input levels or to a second state to pass said current through the other of said paths in response to the other of said input levels, a potential supply, and load impedance means connecting said potential supply and said switching device to pass said current between said potential supply and said device, said load impedance means presenting to said switching device a first load-line in said first state thereof and a second load-line in said second state thereof, said first load-line being displaced a predetermined potential difference from said second load-line.

7. A logic switching circuit comprising:

an active binary element having a reference node and an input node and switchable from one state to another in response to the potential of the input node traversing the potential of the reference node, an output network for connecting said binary element to a load, and an active feedback network extending to said reference node to vary the potential of the latter in time-delayed phase with any variation of the potential of the input node, said active feedback network comprising a current switch having an inner feedback network including a positive feedback sub-network and a negative feedback sub-network.

8. A logic switching circuit as recited in claim 7 wherein said current switch comprises an input node adapted to receive a binary signal having either of two quiescent levels, a source of current, a pair of transistors each having a collector and an emitter, means connecting said node, source and transistors to switch said current through one of said emitters in response to one of said input levels and through the other of said emitters in response to the other of said input levels, a potential supply, and load impedance means connecting said potential supply and one of said collectors to pass said current between said supply and said one collector, said load impedance means and said potential source presenting to said one collector a circuit having a first Thevenin equivalent voltage in response to said one input level and a second Thevenin equivalent voltage displaced from said first voltage in response to said other input level.

9. A logic circuit comprising an input node, a current switch actuable in response to the potential of the input node traversing a reference potential, and an active feedback network to maintain the quiescent value of the reference potential within a predetermined increment of the quiescent potential of the input node, said active feedback network including a second current switch.

10. A logic circuit as recited in claim 9 wherein said second current switch comprises an input node adapted to receive a binary signal having either of two quiescent levels, a source of current, a pair of transistors each having a collector and an emitter, means connecting said node, source and transistors to switch said current through one of said emitters in response to one of said input levels and through the other of said emitters in response to the other of said input levels, a potential supply, a pair of load impedance means each connecting said potential supply and a respective one of said collectors to pass said current between said potential supply and said collectors, and a third impedance means mutually connecting said two load impedance means to present to at least one of said transistors a variable load-line which is a function of the current flow therethrough.

11. In a transistor switching circuit having a source of constant current, a source of reference potential, a plurality of asymmetric impedance current paths connected in the forward direction between said current source and said reference potential, at all times at least one of which is carrying said constant current and at least one of which is the path from emitter to collector of a transistor, and an input node, the improvement comprising an active feedback network including a current switch to maintain the quiescent value of the reference potential within a predetermined increment of the quiescent potential of the input node.

12. In a transistor switching circuit having a source of constant current, a source of reference potential, a plurality of asymmetric impedance current paths connected in the forward direction between said current source and said reference potential, at all times at least one of which is carrying said constant current and at least one of which is the path from emitter to collector of a transistor, an input node, said constant current being switchable from one path to another in response to the potential of the input node traversing the reference potential, and an output node, the improvement comprising an active negative feedback network including a current switch and extending from said output node to said reference potential source to vary the potential of the latter in time-delayed phase with any variation of the potential of the input node, and means for delaying the effect of said feedback network until after said input node potential has traversed said reference potential.

13. A logic switching circuit comprising:

a first current switch having a reference node and an input node and actuable from one state to another in response to the potential of the input node traversing the potential of the reference node, an output node, and an active negative feedback network extending from said output node to said reference node to vary the potential of the latter and including a second current switch, said second current switch including means for delaying the effect of said feedback network until after said input node potential has traversed said reference node potential.

References Cited

UNITED STATES PATENTS

| | | | |
|---|---|---|---|
| 2,923,840 | 2/1960 | Ellsworth | 307—290 |
| 3,183,370 | 5/1965 | Trampel | 307—300 |
| 2,964,652 | 12/1960 | Yourke | 307—216 |
| 3,458,719 | 7/1969 | Weiss | 307—203 |

DONALD D. FORRER, Primary Examiner

B. P. DAVIS, Assistant Examiner

U.S. Cl. X.R.

307—207, 208, 214, 215, 218, 296, 300